(12) United States Patent
Harada

(10) Patent No.: US 10,148,848 B2
(45) Date of Patent: Dec. 4, 2018

(54) IMAGE READING APPARATUS AND IMAGE FORMING APPARATUS

(71) Applicant: KYOCERA Document Solutions Inc., Osaka (JP)

(72) Inventor: Hiroyuki Harada, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/606,256

(22) Filed: May 26, 2017

(65) Prior Publication Data

US 2017/0359479 A1     Dec. 14, 2017

(30) Foreign Application Priority Data

Jun. 10, 2016   (JP) ................................ 2016-116290

(51) Int. Cl.
*H04N 1/00*     (2006.01)
*H04N 1/32*     (2006.01)
(Continued)

(52) U.S. Cl.
CPC ..... *H04N 1/32128* (2013.01); *G06K 15/1801* (2013.01); *G06K 15/1809* (2013.01);
(Continued)

(58) Field of Classification Search
CPC ............. G06K 2209/01; G06K 9/3283; G06K 9/4604; G06K 15/1801; G06K 15/1809;
(Continued)

(56) References Cited

U.S. PATENT DOCUMENTS 5,712,713 A * 1/1998 Hamanaka ........... H04N 1/3873
358/451
6,024,785 A * 2/2000 Morimoto .............. C09D 11/30
106/31.52

(Continued)

FOREIGN PATENT DOCUMENTS

JP     2003-219085 A     7/2003
JP     2004-274198 A     9/2004
(Continued)

*Primary Examiner* — Negussie Worku
(74) *Attorney, Agent, or Firm* — IP Business Solutions, LLC

(57) ABSTRACT

An image reading apparatus includes a document setting table, an image data generation unit, a downsized image data generation unit, a document information generation unit, and an image cropping unit. The image data generation unit reads a plurality of source documents placed on the document setting table and generates image data representing the plurality of source documents. The downsized image data generation unit generates downsized image data by reducing a size of the image data. The document information generation unit analyzes the downsized image data to detect respective positions of the plurality of source documents and generate document information indicating the detected positions. The image cropping unit cuts out a plurality of regions from the image data according to the document information and acquires a plurality of items of cropped image data respectively representing the plurality of source documents.

4 Claims, 8 Drawing Sheets

(51) Int. Cl.
  *G06K 15/02* (2006.01)
  *H04N 1/387* (2006.01)
  *H04N 1/393* (2006.01)

(52) U.S. Cl.
  CPC ..... *H04N 1/00708* (2013.01); *H04N 1/00779* (2013.01); *H04N 1/32144* (2013.01); *H04N 1/387* (2013.01); *H04N 1/3875* (2013.01); *H04N 1/3935* (2013.01)

(58) Field of Classification Search
  CPC ... G06T 3/0031; G06T 5/001; H04N 1/32144; H04N 1/00358; H04N 1/00374; H04N 1/00708; H04N 1/00779; H04N 1/00795; H04N 1/00801; H04N 1/00811; H04N 1/00824; H04N 1/32128; H04N 1/387; H04N 2201/3245
  USPC ....... 382/199, 275, 100, 175, 176, 195, 202, 382/255, 276, 290, 293, 296; 358/530
  See application file for complete search history.

(56) References Cited

U.S. PATENT DOCUMENTS

| | | | |
|---|---|---|---|
| 6,507,415 B1* | 1/2003 | Toyoda | H04N 1/3876 358/450 |
| 7,161,616 B1* | 1/2007 | Okamoto | B60R 1/00 348/148 |
| 7,327,900 B2 | 2/2008 | Harada et al. | |
| 7,929,186 B2 | 4/2011 | Kubota et al. | |
| 9,253,349 B2* | 2/2016 | Amtrup | H04N 1/00251 |
| 2001/0015821 A1* | 8/2001 | Namizuka | G06T 3/40 358/1.15 |
| 2004/0264805 A1 | 12/2004 | Harada et al. | |
| 2007/0002400 A1 | 1/2007 | Kubota et al. | |
| 2008/0252938 A1* | 10/2008 | Cazier | H04N 1/387 358/450 |
| 2009/0003649 A1* | 1/2009 | Wakabayashi | H04N 1/00358 382/100 |
| 2009/0316218 A1* | 12/2009 | Miyagi | H04N 1/40 358/448 |
| 2011/0164258 A1* | 7/2011 | Nakamura | G06T 1/00 358/1.2 |
| 2012/0177302 A1* | 7/2012 | Habuka | H04N 1/3876 382/274 |
| 2013/0070319 A1* | 3/2013 | Yamada | H04N 1/48 358/518 |
| 2013/0135654 A1* | 5/2013 | Imamura | H04N 1/00 358/1.13 |
| 2013/0190600 A1* | 7/2013 | Gupta | A61B 8/0866 600/410 |
| 2014/0184780 A1* | 7/2014 | Abe | G02B 21/367 348/80 |
| 2014/0307967 A1* | 10/2014 | Kacher | G06K 9/3283 382/176 |
| 2015/0147048 A1* | 5/2015 | Kim | H04N 21/4852 386/282 |
| 2015/0264213 A1* | 9/2015 | Tai | H04N 1/6008 358/509 |
| 2015/0365559 A1* | 12/2015 | Nakamura | H04N 1/32133 358/3.28 |
| 2016/0203382 A1* | 7/2016 | Gardiner | G06K 9/4633 382/190 |
| 2016/0331224 A1* | 11/2016 | Uji | A61B 3/0025 |
| 2017/0280062 A1* | 9/2017 | Taketani | H04N 5/265 |
| 2017/0359479 A1* | 12/2017 | Harada | G06K 15/1801 |
| 2017/0367580 A1* | 12/2017 | DiMaio | A61B 5/0064 |
| 2017/0370546 A1* | 12/2017 | Ohno | F21S 48/1154 |

FOREIGN PATENT DOCUMENTS

| | | |
|---|---|---|
| JP | 2007-013468 A | 1/2007 |
| JP | 2007-110521 A | 4/2007 |

* cited by examiner

IMAGE READING APPARATUS AND IMAGE FORMING APPARATUS

INCORPORATION BY REFERENCE

This application claims priority to Japanese Patent Application No. 2016-116290 filed on Jun. 10, 2016, the entire contents of which are incorporated by reference herein.

BACKGROUND

The present disclosure relates to an image forming apparatus including an image reading apparatus and an image reading apparatus, and in particular to a technique to read a plurality of source documents placed on a document setting table.

Image reading apparatuses capable of reading a plurality of source documents placed on a document setting table are widely known. Such image reading apparatuses are configured to perform the reading operation (scanning operation) of the source documents placed on the document setting table the same number of times as the number of the source documents, to thereby acquire a plurality of items of image data representing the respective source documents.

SUMMARY

The disclosure proposes further improvement of the foregoing technique.

In an aspect, the disclosure provides an image reading apparatus including a document setting table, an image data generation unit, a downsized image data generation unit, a document information generation unit, and an image cropping unit. The image data generation unit reads a plurality of source documents placed on the document setting table and generates image data representing the plurality of source documents. The downsized image data generation unit generates downsized image data by reducing a size of the image data. The document information generation unit analyzes the downsized image data to detect respective positions of the plurality of source documents and generate document information indicating the detected positions. The image cropping unit cuts out a plurality of regions from the image data according to the positions indicated by the document information, and acquires a plurality of items of cropped image data respectively representing the plurality of source documents.

In another aspect, the disclosure provides an image forming apparatus including the foregoing image reading apparatus and an image forming unit that forms an image on a recording sheet according to image data generated by the image reading apparatus.

DETAILED DESCRIPTION

Figure 1:
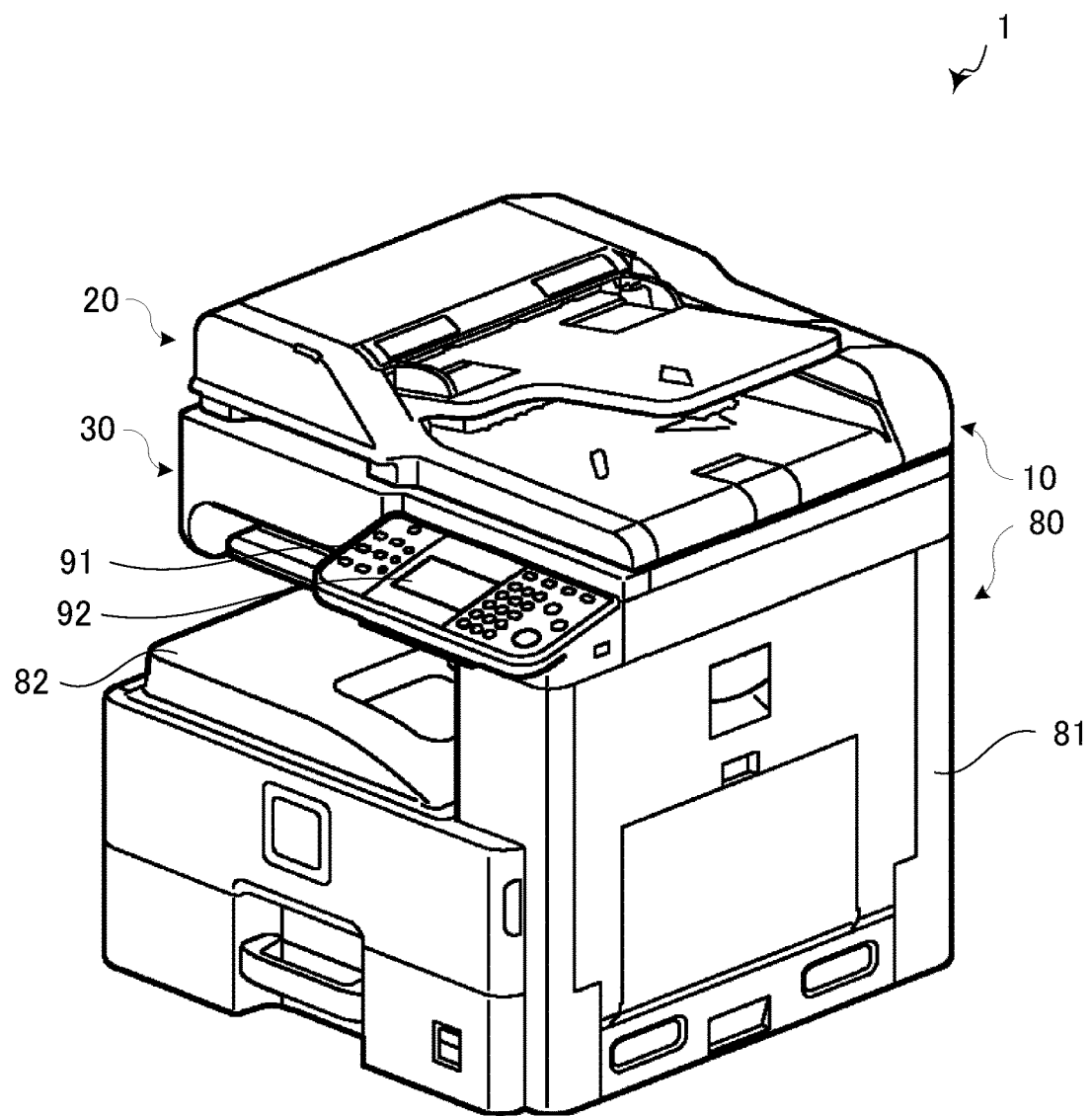
FIG. 1 is a perspective view showing an image forming apparatus including an image reading apparatus according to an embodiment of the disclosure.

Hereafter, an image reading apparatus according to an embodiment of the disclosure, and an image forming apparatus including the image reading apparatus will be described with reference to the drawings. FIG. 1 is a perspective view showing the image forming apparatus including the image reading apparatus according to the embodiment of the disclosure.

The image forming apparatus 1 is a multifunction peripheral configured to execute a plurality of functions such as facsimile transmission/reception, copying, printing, and scanning. As shown in FIG. 1, the image forming apparatus 1 includes a main body 80 and an image reading apparatus 10 located on the upper side of the main body 80.

A non-illustrated paper feed unit and an image forming unit are provided inside a casing 81 constituting the outer shell of the main body 80. The image forming unit forms an image on a recording sheet transported from the paper feed unit, according to image data generated by the image reading apparatus 10. The recording sheet on which the image has been formed undergoes a fixing process and is discharged to an output tray 82.

An operation unit 91 and a display unit 92 are provided on the front side of the casing 81 of the main body 80. The display unit 92 includes, for example, a liquid crystal display (LCD) or an organic light-emitting diode (OLED) display. The operation unit 91 includes a plurality of operation keys through which an operation of a user with respect to a screen displayed on the display unit 92 is inputted.

By the operation of the user made through the operation unit 91, an image forming instruction, an image reading instructions, or other instructions are inputted to the image forming apparatus 1 or the image reading apparatus 10. The instruction inputted is received by a reception unit 106 to be subsequently described (see FIG. 4).

Figure 2:
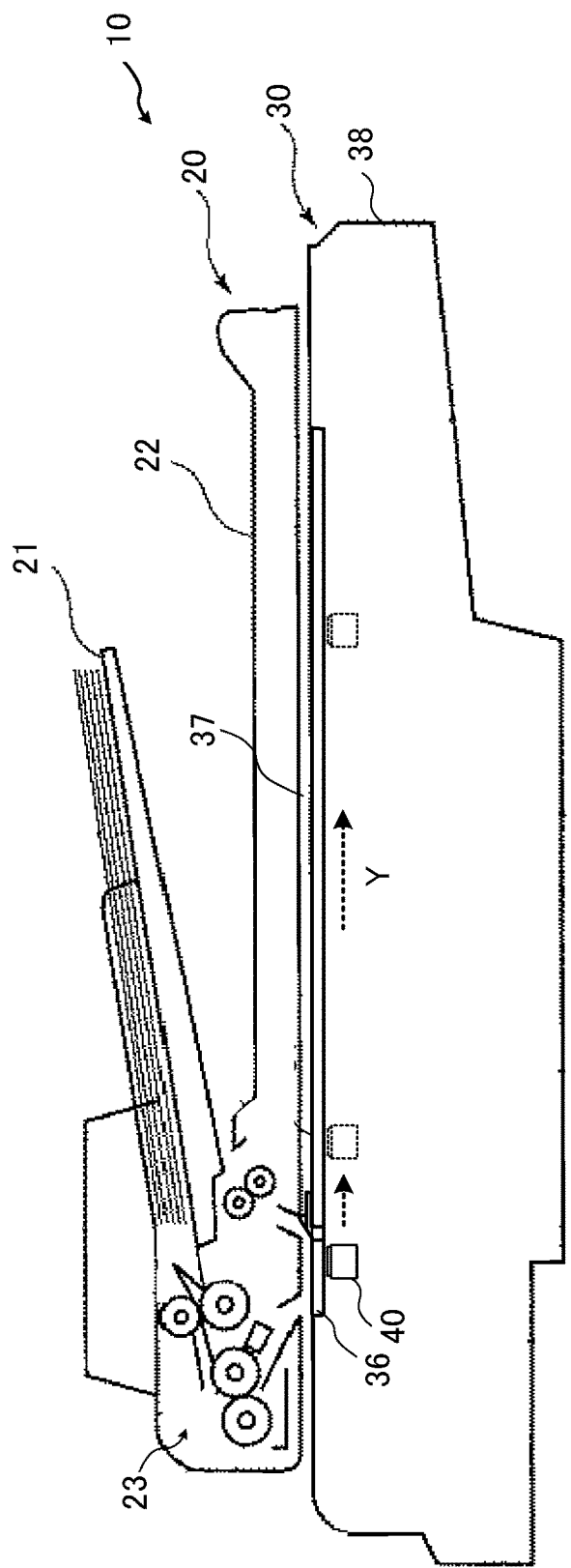
FIG. 2 is a side cross-sectional view showing a structure of the image reading apparatus according to the embodiment of the disclosure.

FIG. 2 is a side cross-sectional view showing a structure of the image reading apparatus 10 according to the embodiment of the disclosure. The image reading apparatus 10 includes an image reading unit 30 (image data generation unit), and a document feeding unit 20 located on the upper side of the image reading unit 30.

The document feeding unit 20 includes a drive mechanism 23 having a feed roller and a transport roller, to pick up source documents stacked on a document setting tray 21 one by one, and transport the source document to a position opposing a document reading slit 36, so as to allow the image reading unit 30 to read the source document therethrough, and to discharge the source document to a document discharge section 22.

Figure 3:
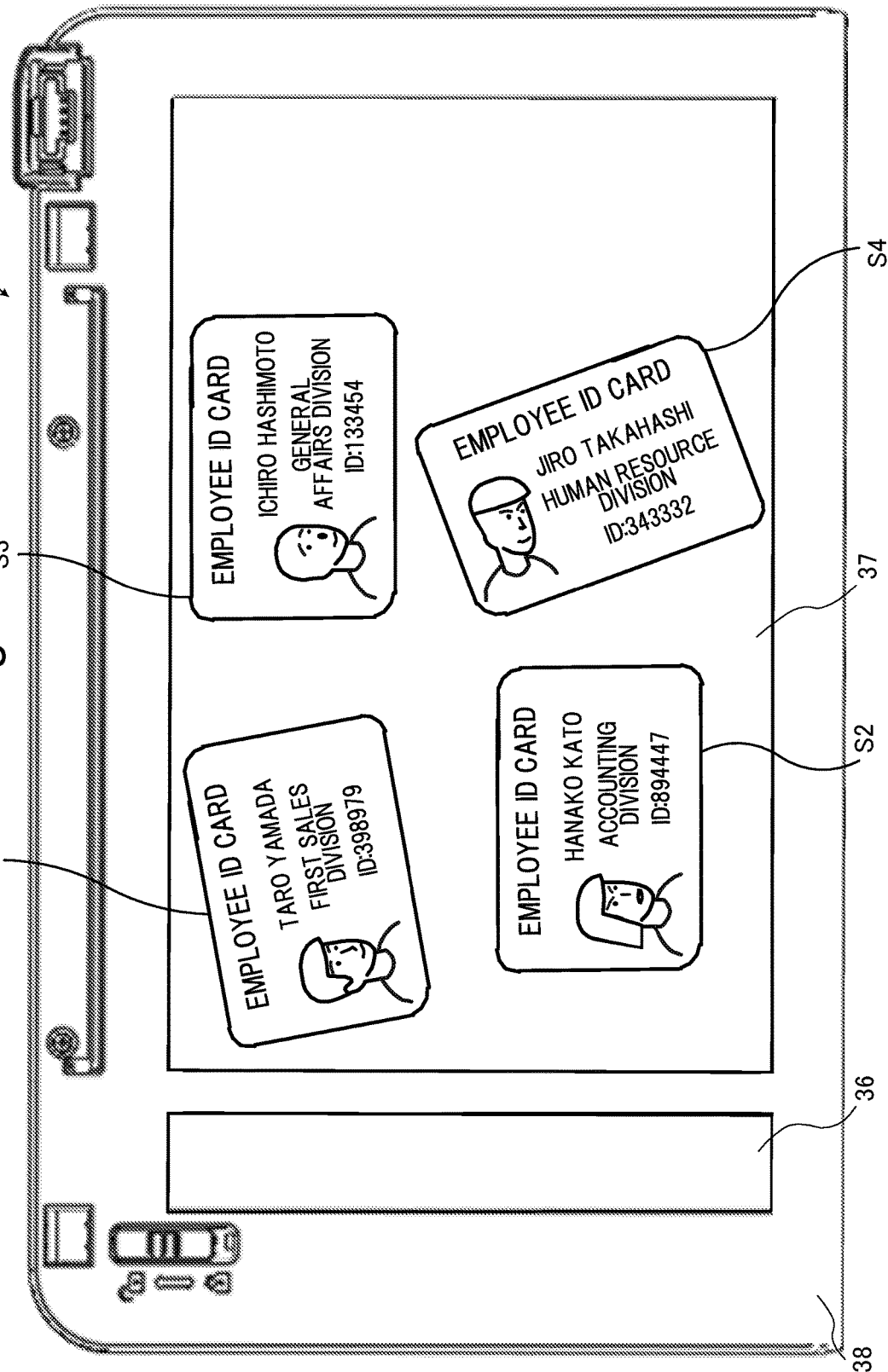
FIG. 3 is a top view showing an image reading unit of the image reading apparatus according to the embodiment of the disclosure.

FIG. 3 is a top view of the image reading unit 30. The image reading unit 30 includes a contact glass 37 fitted in an opening formed in a main body frame 38. The source document to be read is placed on the upper face of the contact glass 37, and hence the contact glass 37 serves as a document setting table. In the example shown in FIG. 3, four sheets of source documents, namely documents S1 to S4, are placed on the contact glass 37.

Referring back to FIG. 2, a reading unit 40, movable in a sub scanning direction (direction indicated by an arrow Y in FIG. 2), is provided inside the main body frame 38 and on the lower side of the contact glass 37. The reading unit 40 is made to reciprocate in the sub scanning direction by a non-illustrated reading unit driver including a motor and gears, to read the source document placed on the contact glass 37.

The reading unit 40 stores the image data representing the source document read as above in an image memory 41 (see FIG. 4), in an image format based on lossless compression, such as a raw image format (RAW) or portable network graphics (PNG).

Figure 4:
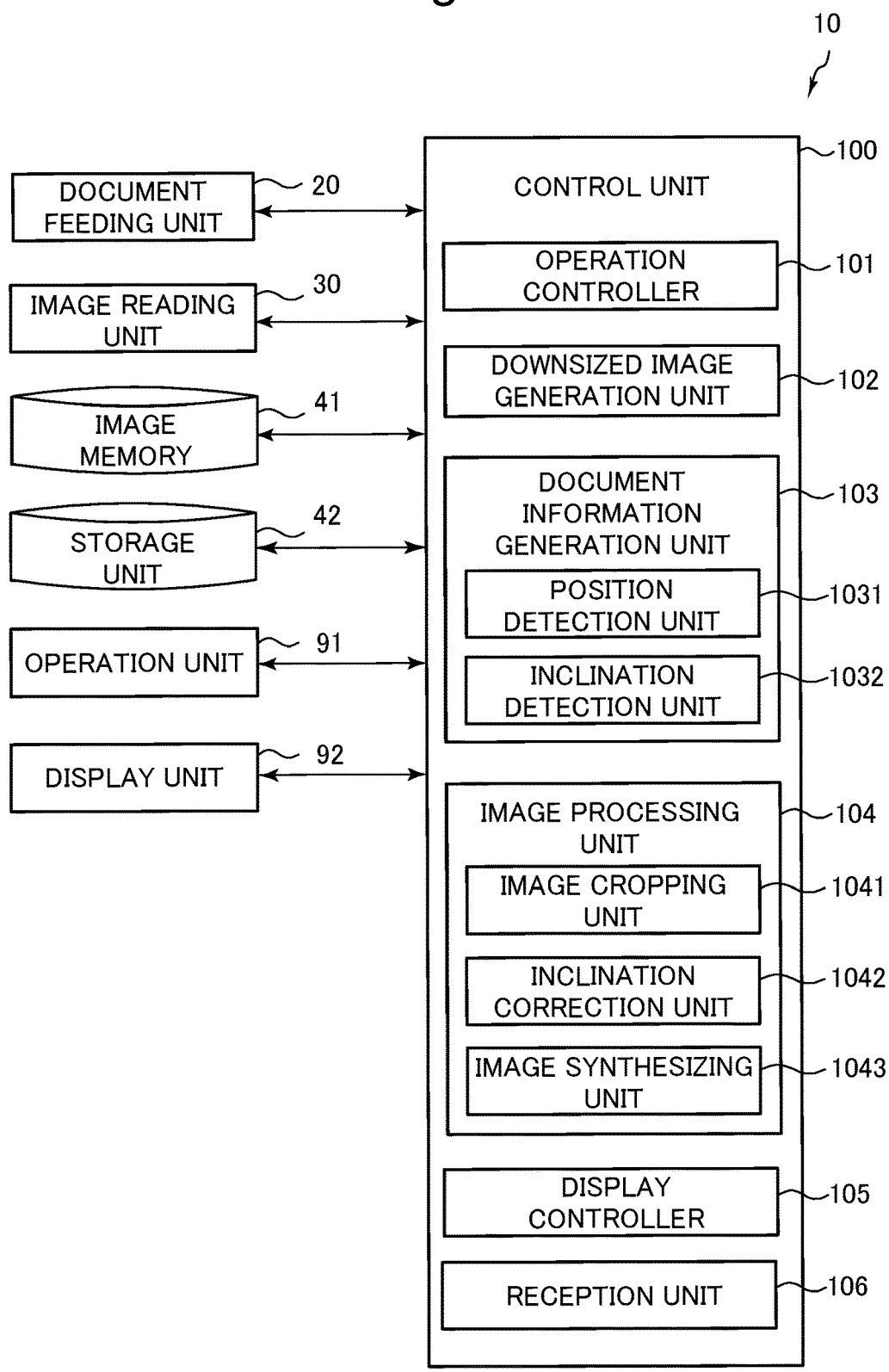
FIG. 4 is a functional block diagram showing an essential internal configuration of the image reading apparatus according to the embodiment of the disclosure.

FIG. 4 is a functional block diagram showing an essential internal configuration of the image reading apparatus 10. The image reading apparatus 10 includes the document feeding unit 20, the image reading unit 30, the image memory 41, a storage unit 42, an operation unit 91, a display unit 92, and a control unit 100. The same components as those shown in FIG. 1 are given the same numeral, and the description thereof will not be repeated.

The image memory 41 is used to temporarily store, for example, the image data generated by the image reading unit 30 from the source document. The storage unit 42 is a large-capacity storage device such as a hard disk drive (HDD). The storage unit 42 contains programs and data necessary for the operations of the image forming apparatus 1 and the image reading apparatus 10.

The control unit 100 is constituted of a processor such as a central processing unit (CPU) or a digital signal processor (DSP), and memories such as a random-access memory (RAM) and a read-only memory (ROM). The control unit 100 acts as an operation controller 101, a downsized image generation unit 102, a document information generation unit 103, an image processing unit 104, a display controller 105, and a reception unit 106, when the processor executes a control program stored in the memory or the storage unit 42. Here, the cited components of the control unit 100 may each be constituted in the form of a hardware circuit, instead of being performed according to the control program.

The operation controller 101 serves to control the overall operation of the image reading apparatus 10 and the image forming apparatus 1. In particular, the operation controller 101 controls the action of the reading unit driver which moves the reading unit 40 in the sub scanning direction, so as to control the image reading operation performed by the image reading unit 30.

The downsized image generation unit 102 (downsized image data generation unit) is configured to generate a downsized image of the source document on the basis of the image data generated by the image reading unit 30 from the source document that has been read. The downsized image generation unit 102 stores the generated data of the downsized image in the storage unit 42.

The document information generation unit 103 includes a position detection unit 1031 and an inclination detection unit 1032, and is configured to analyze the downsized image data generated by the downsized image generation unit 102, to thereby generate document information indicating the position and inclination of the source document placed on the contact glass 37.

The position detection unit 1031 detects the position of the source document placed on the contact glass 37. When a plurality of source documents are placed on the contact glass 37, the position detection unit 1031 detects the respective positions of the plurality of source documents.

More specifically, the position detection unit 1031 performs Hough conversion of the downsized image data generated by the downsized image generation unit 102, to detect edge positions in the downsized image data. The position detection unit 1031 then identifies the positions of the four sides of the source documents on the basis of the detected edge positions, which are utilized as information indicating the respective positions of the source documents. The position detection unit 1031 converts the positions of the source documents in the downsized image data thus detected to the positions in the image data of the original size, and stores the converted data in the storage unit 42.

As described above, the position detection unit 1031 is not configured to analyze the image data generated by the image reading unit 30 to detect the position of the source document, but configured to analyze the downsized image data to detect the position of the source document. Such an arrangement shortens the time required for detecting the position of the source document. In addition, computing resources such as the processor and the memory, necessary for detecting the position of the source document, can be saved.

The inclination detection unit 1032 detects the inclination of the source document placed on the contact glass 37, and generates information indicating the inclination detected, as part of document information. When a plurality of source documents are placed on the contact glass 37, the inclination detection unit 1032 detects the inclination of each of the source documents. More specifically, the inclination detection unit 1032 detects, as the position detection unit 1031 does, the inclination of the source documents on the basis of the edge positions detected through the Hough conversion of the downsized image data.

The image processing unit 104 includes an image cropping unit 1041, an inclination correction unit 1042, and an image synthesizing unit 1043, and is configured to perform image cropping and inclination correction with respect to the image data generated by the image reading unit 30, on the basis of the document information generated by the document information generation unit 103.

The image cropping unit 1041 cuts out a plurality of regions from the image data (auto-cropping) according to the positions indicated by the document information, and acquires a plurality of items of cropped image data respectively representing the plurality of source documents.

The inclination correction unit 1042 rotates the cropped image data acquired by the image cropping unit 1041 according to the inclination indicated by the document information, so as to correct the inclination of each cropped image data to a horizontal orientation. Accordingly, the inclination correction unit 1042 generates image data in which the source documents are not inclined.

The image synthesizing unit 1043 synthesizes the plurality of items of cropped image data, the inclination of which has been corrected by the inclination correction unit 1042, into a single piece of image data.

The display controller 105 is configured to control screen display operations performed by the display unit 92.

The reception unit 106 is configured to receive the inputs of the image reading instruction and the image forming instruction, made by the user through the operation unit 91.

Figure 5:
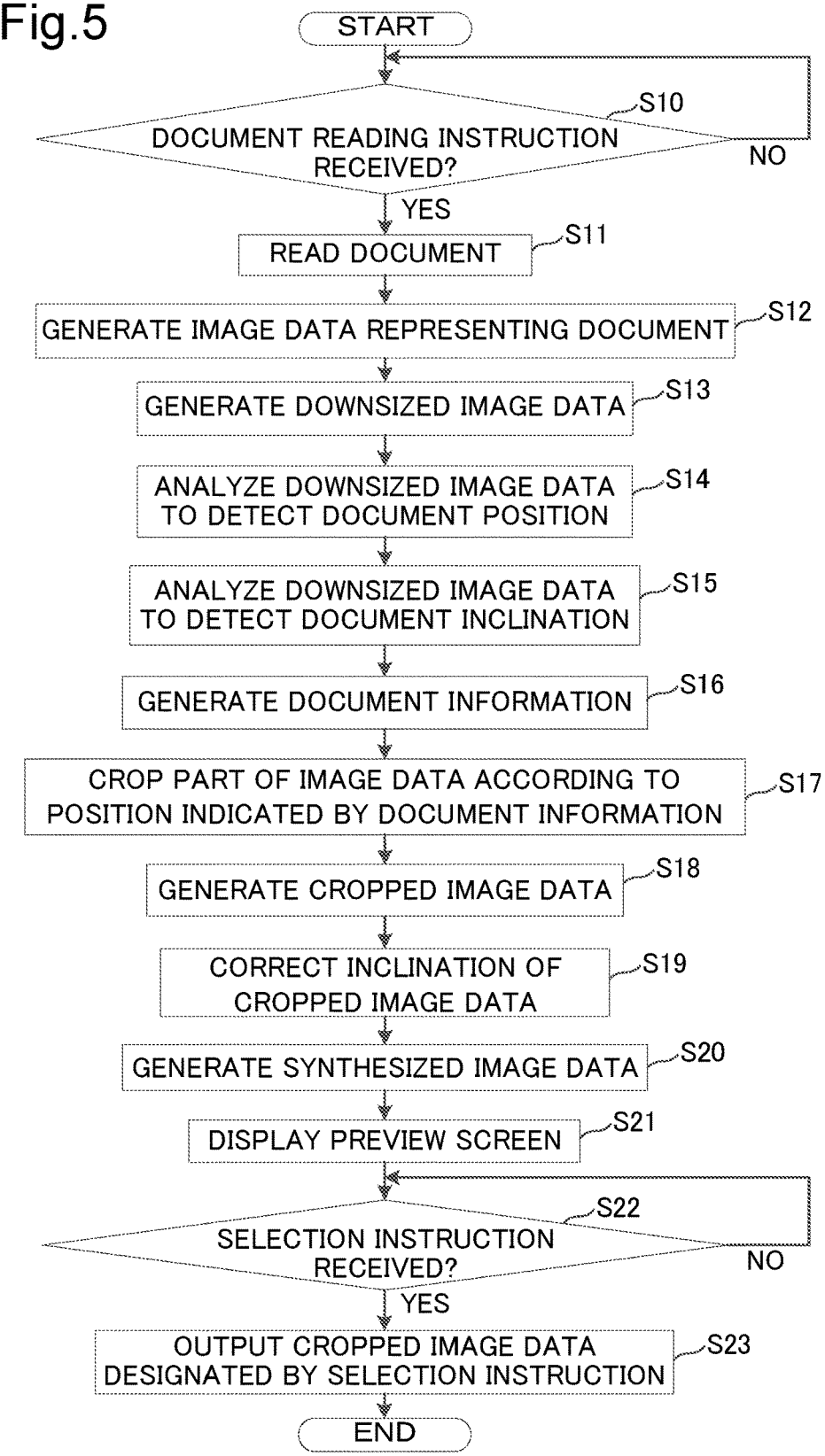
FIG. 5 is a flowchart showing an operation process performed by the image reading apparatus according to the embodiment of the disclosure.
Figure 6:
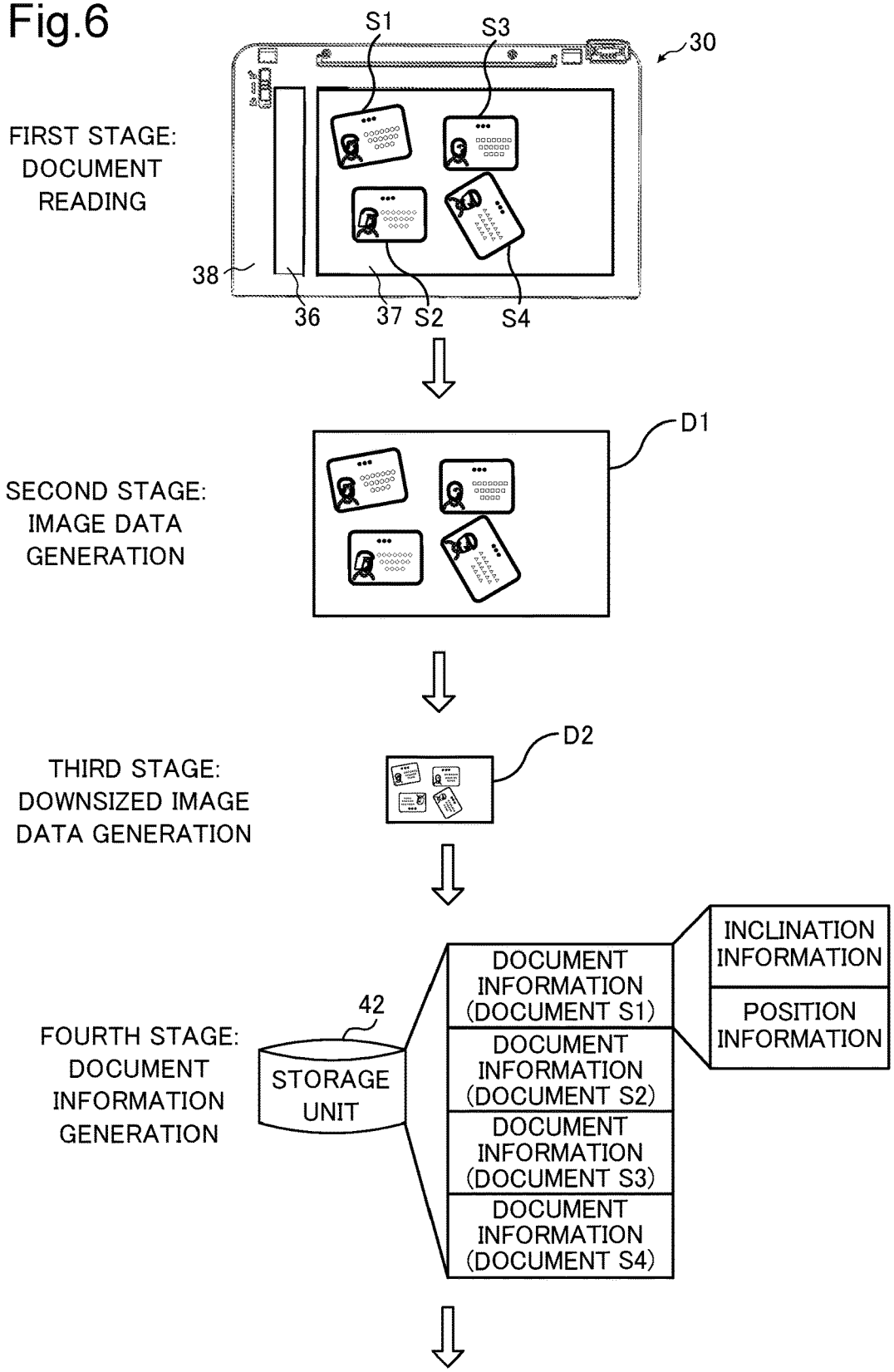
FIG. 6 is a schematic drawing showing an operation performed by the image reading apparatus according to the embodiment of the disclosure.
Figure 7:
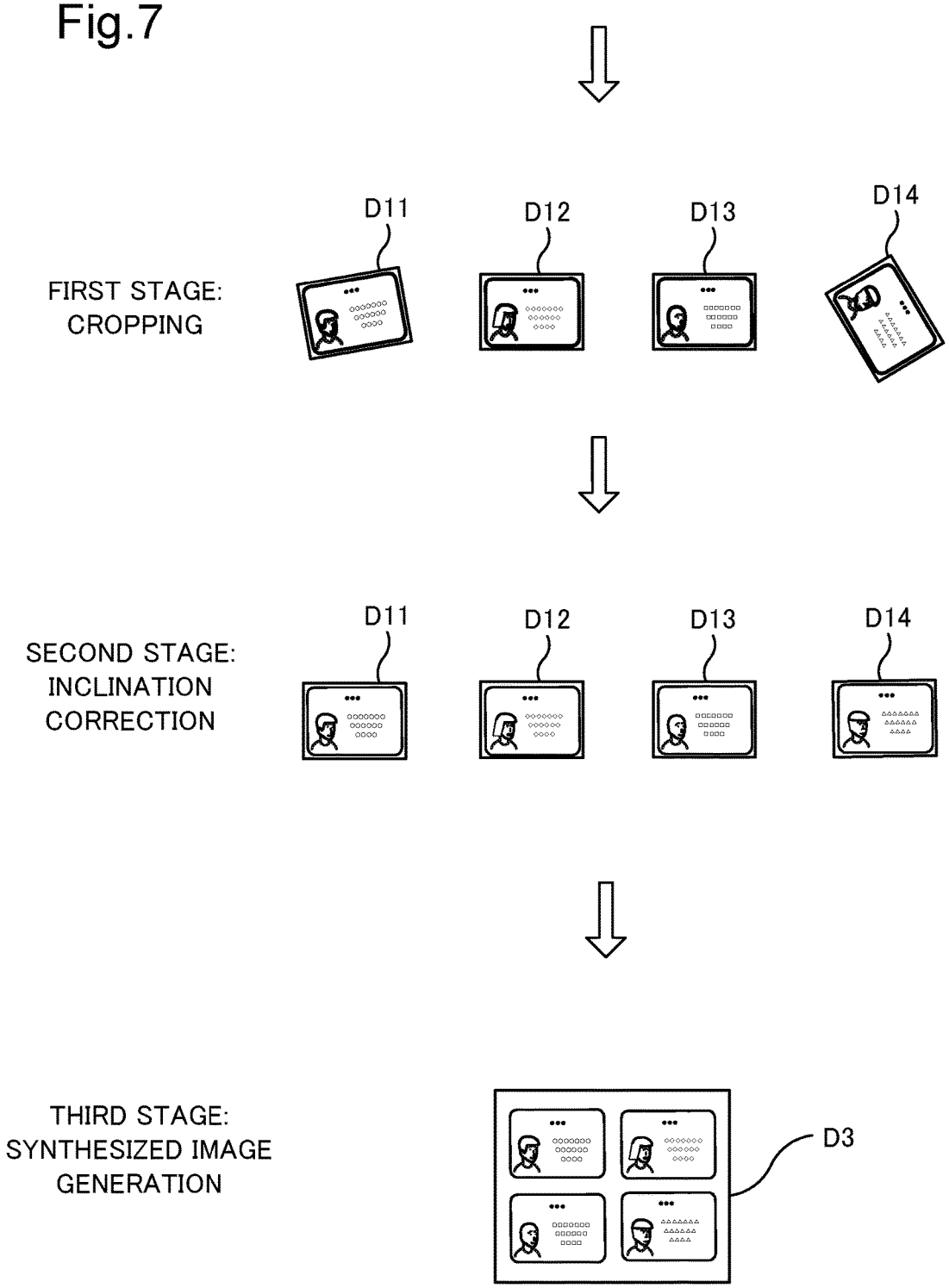
FIG. 7 is a schematic drawing showing an operation performed by the image reading apparatus according to the embodiment of the disclosure.

FIG. 5 is a flowchart showing an operation process performed by the image reading apparatus 10. FIG. 6 and FIG. 7 are schematic drawings each showing the operation performed by the image reading apparatus 10. The characters in FIG. 3 should have been same in the respective parts in FIG. 6 and FIG. 7. Because of the size of some parts of FIG. 6 and FIG. 7 being relatively smaller, the characters would have become too small and been unable to comply with the rules. For this reason, black dots and the like are used in FIG. 6 and FIG. 7 to replace the characters. Hereunder, the operation of the image reading apparatus 10 configured as above will be described referring primarily to FIG. 5, making references also to FIG. 6 and FIG. 7 where appropriate.

When the reception unit 106 receives an image reading instruction to read an image using the auto-cropping function (YES at step S10), the image reading unit 30 reads the source documents placed on the contact glass 37 under the control of the operation controller 101 as illustrated in a first stage in FIG. 6 (step S11), and generates the image data representing the source documents as illustrated in a second stage in FIG. 6 (step S12). In this process, the image reading unit 30 performs the reading over a predetermined readable range, for example from an end to the other end of the contact glass 37.

In the example shown in FIG. 6, four source documents, namely documents S1 to S4, are placed on the contact glass 37, as illustrated in the first stage. Accordingly, the image reading unit 30 generates image data D1 representing the image including the four documents S1 to S4, as illustrated in the second stage.

After step S12, the downsized image generation unit 102 generates a downsized image D2 of the source documents on the basis of the image data generated by the image reading unit 30 from the source documents, as illustrated in a third stage in FIG. 6 (step S13).

After step S13, the position detection unit 1031 analyzes the downsized image data generated at step S12, and detects the positions of the respective source documents included in the downsized image data (step S14).

In addition, the inclination detection unit 1032 analyzes the downsized image data generated at step S12, and detects the inclination of each of the source documents included in the downsized image data (step S15).

The document information generation unit 103 stores the document information including the position information indicating the positions detected at step S14 and the inclination information indicating the inclination detected at step S15, in the storage unit 42 (step S16). As result, as illustrated in a fourth stage in FIG. 6, four items of document information 1 to 4, respectively indicating the position and inclination of the documents S1 to S4, are stored in the storage unit 42.

After step S16, the image cropping unit 1041 cuts out partial regions of the image data according to the positions indicated by the document information (step S17), and generates a plurality of items of cropped image data respectively representing the source documents (step S18). In the example shown in FIG. 7, the image cropping unit 1041 cuts out cropped image data D11 representing the document S1, cropped image data D12 representing the document S2, cropped image data D13 representing the document S3, and cropped image data D14 representing the document S4, from the image data D1, as illustrated in a first stage in FIG. 7.

After step S18, the inclination correction unit 1042 corrects the inclination of the cropped image data according to the inclination indicated by the document information, with respect to each of the documents S1 to S4 (step S19). As result, the inclination correction unit 1042 acquires image data representing the source documents not inclined, as illustrated in a second stage in FIG. 7. The inclination correction unit 1042 stores the image data representing the images that have undergone the inclination correction, in the storage unit 42.

After step S19, the image synthesizing unit 1043 generates synthesized image data, by synthesizing the image data acquired after the inclination correction (step S20). In the example shown in FIG. 7, the image synthesizing unit 1043 synthesizes the cropped image data items D11 to D14, to thereby generate a single image data item D3.

Figure 8:
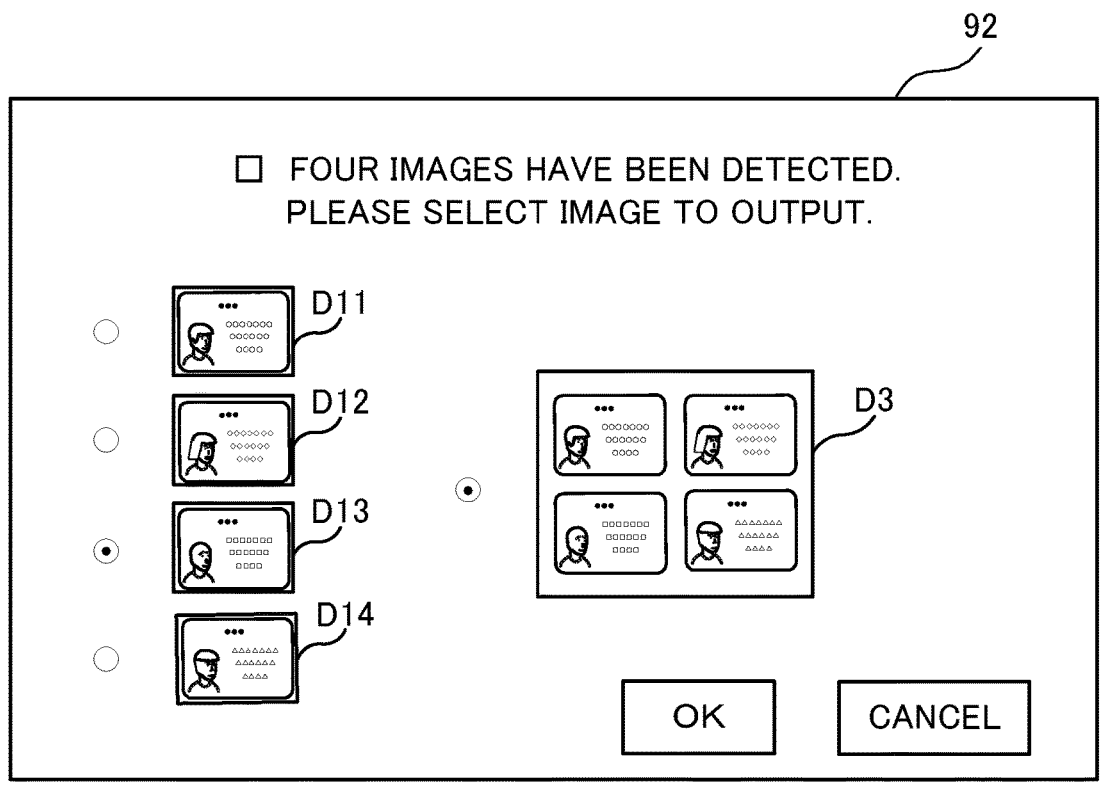
FIG. 8 is a schematic drawing showing an example of a screen displayed in a display unit of the image reading apparatus according to the embodiment of the disclosure.

After step S20, the display controller 105 causes the display unit 92 to display a preview screen (see FIG. 8) showing the cropped image data after the inclination correction generated at step S19, and the synthesized image data generated at step S20 (step S21). The characters in FIG. 3 should have been same in the respective parts in FIG. 8. Because of the size of some parts of FIG. 8 being relatively smaller, the characters would have become too small and been unable to comply with the rules. For this reason, black dots and the like are used in FIG. 8 to replace the characters.

When the reception unit 106 receives a selection instruction with respect to the preview screen (YES at step S22), the image reading apparatus 10 outputs the image corresponding to the image data designated by the selection instruction (step S23). In the example shown in FIG. 8, the cropped image data D13 representing the document S3 and the synthesized image data D3 are selected, and therefore the cropped image data D13 and the synthesized image data D3 are outputted. Examples of the method of outputting the image data include transmitting the selected image data to an external personal computer (PC) via e-mail, and causing the image forming unit to form the corresponding image on a recording sheet. In this case, a communication controller that controls the e-mail transmission or the image forming unit that forms the image serves as the output unit.

Now, with the existing image reading apparatuses, the reading operation of the source documents has to be performed the same number of times as the number of source documents placed on the document setting table, and hence it takes a long time to read those source documents.

With the image reading apparatus 10 according to this embodiment, in contrast, the image reading unit 30 reads the plurality of source documents placed on the contact glass 37 and generates the image data representing the plurality of source documents. The downsized image generation unit 102 generates the downsized image data by reducing the size of the image data. The document information generation unit 103 analyzes the downsized image data to detect the respective positions of the plurality of source documents and generate the document information indicating the detected positions. The image cropping unit 1041 cuts out the plurality of regions from the image data according to the positions indicated by the document information, and acquires the plurality of items of cropped image data respectively representing the plurality of source documents. Therefore, the configuration according to this embodiment shortens the time for reading the plurality of source documents placed on the contact glass 37, compared with the existing apparatuses.

The disclosure is not limited to the foregoing embodiment but may be modified in various manners.

For example, the control program referred to in the foregoing embodiment may be recorded on a non-transitory computer-readable recording medium, such as a hard disk, a CD-ROM, a DVD-ROM, or a semiconductor memory. In this case, the non-transitory computer-readable recording medium, having the control program recorded thereon, constitutes another embodiment of the disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image reading apparatus comprising:
   a document setting table;
   an image reading unit that reads a plurality of source documents placed on the document setting table and generates a first image file representing the plurality of source documents;
   an image memory that stores the first image file; and
   a control unit that includes a processor and acts, when the processor executes a control program, as:
      a downsized image file generation unit that generates downsized image file by reducing a size of the of first image file;
      a document information generation unit that analyzes the downsized image file to detect respective positions of the plurality of source documents and inclination of each of the plurality of source documents, and generate document information indicating the detected positions and the detected inclination;
      an image cropping unit that crops a plurality of regions from the first image file according to the positions indicated by the document information, and acquires a plurality of items of cropped image data respectively representing the plurality of source documents;
      an inclination correction unit that rotates the cropped image data according to the inclination indicated by the document information, to thereby correct the inclination of each of the plurality of items of cropped image data to a horizontal orientation; and
      an image data synthesizing unit that synthesizes the plurality of items of cropped image data, the inclination of which has been corrected to the horizontal orientation by the inclination correction unit, and generates a second image file representing the plurality of source documents, the inclination of which has been corrected to the horizontal orientation.

2. The image reading apparatus according to claim 1, further comprising a display unit,
   wherein the control unit further acts as a display controller that causes the display unit to display a preview screen showing each of the plurality of items of cropped image data, the inclination of which has been corrected to the horizontal orientation by the inclination correction unit, and the second image file having been generated by the image data synthesizing unit, the preview screen being displayed in a manner such that at least one of each of the plurality of items of cropped image data and the second image file is selectably displayed.

3. An image forming apparatus comprising:
   the image reading apparatus according to claim 2; and
   an image forming unit that forms an image on a recording sheet according to the second image file.

4. The image forming apparatus according to claim 3, further comprising an operation unit to which an instruction from a user is inputted,
   wherein the control unit further acts as an operation controller configured to:
      when an instruction to select one of the plurality of items of cropped image data is inputted through the operation unit, cause the image forming unit to form an image corresponding to the selected one of the plurality of items of cropped image data; and
      when an instruction to select the second image file is inputted through the operation unit, cause the image forming unit to form an image corresponding to the second image file.

* * * * *